INVENTOR.
RALPH HIELEMA

United States Patent Office 3,700,520
Patented Oct. 24, 1972

3,700,520
METHOD OF APPLYING CORROSION AND MECHANICAL PROTECTIVE COATINGS IN FORM OF TAPES TO A METAL PIPE
Ralph Hielema, Locust Hill, Ontario, Canada, assignor to The Kendall Company, Chicago, Ill.
Filed July 13, 1970, Ser. No. 54,489
Claims priority, application Canada, Apr. 16, 1970, 080,271
Int. Cl. B31c *13/00;* B65h *81/00;* F16l *9/14*
U.S. Cl. 156—162                                   6 Claims

ABSTRACT OF THE DISCLOSURE

A method of coating a pipe and a pipe coated thereby, said method comprising the steps of progressively spirally winding a corrosion protective adhesive coated plastic tape onto the outer surface of the pipe with a spiral overlap, covering the coated pipe by progressively winding a film thereon with a predetermined overlap, and, as the film is wound onto the coated pipe, introducing and distributing under pressure a hot melted adhesive into intimate contact with the surface of the marginal portion of the trailing edge of the film and the surfaces of the overlapped portion along the leading edge thereof and of the portion of the tape immediately adjacent the leading edge of the film.

---

This invention relates to the protective coating of pipes.

In particular, the invention is concerned with the method of coating a pipe with a first layer of corrosion protective plastic pressure-sensitive adhesive tape and a second layer of a sheet material providing mechanical protection of the tape wherein the tape and sheet are bonded together by a hot, melted thermoplastic adhesive.

It is well known to apply a corrosion protective coating and a mechanical protective coating to a metal pipe and to apply these coatings in the form of adhesive tapes which are wound onto the pipe in an overlapping relationship by rotating the pipe in conventional pipe wrapping machines. Thermoplastic tapes which have a pressure-sensitive adhesive on one surface are frequently used to form the corrosion resistant inner layer and thermoplastic tapes having a pressure sensitive adhesive have also been used to form the outer mechanical protective layer. The relatively high cost of pressure-sensitive adhesive coated thermoplastic tape is a very significant factor in the cost of producing coated pipe with the result that the industry has been searching for less expensive alternatives. One of the most common alternatives is to employ a paper sheet as the outer mechanical protective coating. The paper sheet is wound onto the pipe in the usual manner by spirally wrapping the sheet over the tape-covered pipe with the marginal portions of adjacent spiral convolutions of the sheet overlapping one another. In some systems, the spiral convolutions of the paper sheet are adhesively connected to each other in the area of the overlap. While the paper sheet overwrap is considerably cheaper than the thermoplastic tape overwrap, it provides only mechanical protection of the underlying corrosion protective tape primarily during the handling of the pipe prior to and during burial of the pipe.

A difficulty with the use of pressure-sensitive adhesive tape as an overwrap lies in the fact that the bond formed by the pressure-sensitive adhesive is not permanent in that it can be peeled back in the area of the overlap by the substantial axial forces which may be applied to an underground pipe when it is being located in its operative position. Frequently, underground pipes are forcibly driven into the ground in an axial direction and, if the exposed side edges of that protective tape are driven into the ground, there is a tendency for the tape to peel back in the area of the overlap. During the installation of a pipe, the operators can not reasonably be expected to examine each section of pipe to ensure that it is laid down in the correct direction. This problem is a direct result of the fact that the pressure-sensitive adhesives which are presently in use in the pipe coating industry do not provide a sufficiently strong bond between the overlapping portions of the tape overwrap.

A factor which contributes to the high cost of the pressure-sensitive adhesive coated tapes as the outer wrap is the fact that the entire undersurface of the tape is coated with a pressure-sensitive adhesive. Tapes with a pressure-sensitive adhesive coating on a marginal portion along one edge of the backing have been proposed but have not found acceptance because of problems in producing the tape and problems presented by the irregular diameter of supply rolls of such tape.

Another disadvantage of pressure-sensitive adhesive tapes as an outer wrap is the incomplete contact of the adhesive to the underlying corrosion protective tape in the region immediately adjacent the overlapped edge of the previous spiral convolution of the outer wrap tape. Gaps between the surface of the adhesive in the marginal portions of the trailing edge of a spirally wound convolution immediately adjacent the overlapped edge of the preceeding convolution and the back surface of the corrosion protective wrap immediately thereunder have been found to occur. Thus, there is an interrupted or incomplete adhesive contact in the region where peel back is most likely to occur.

The present invention overcomes the difficulties of the prior art described above by providing a method of coating a pipe which is less expensive than prior methods in which a pressure-sensitive adhesive thermoplastic tape has been used and which also provides a mechanically more durable bond than that achieved by the pressure-sensitive adhesive tape.

A further object of this invention is to provide a method of protectively coating a pipe by means of a coating which provides greater weather resistance and mechanical protection than the paper tape coating previously described.

According to the present invention, a method of coating a pipe comprises the steps of coating a pipe by progressively spirally winding a corrosion protective adhesive coated plastic tape onto the outer surface thereof with a marginal overlap. A mechanical protective film or tape is then applied to cover the coated pipe by progressively winding a film of mechanical protective plastic sheet material tape onto the coated pipe with a predetermined overlap. As it is wound onto the coated pipe, a mass of the hot melted adhesive is introduced and distributed under pressure into intimate contact with the surface of the marginal portion of the trailing edge of the film and the surfaces of the overlapped portion along the leading edge thereof and of the portion of the immediately adjacent the leading edge of the film. The hot melted thermoplastic adhesive mass may be applied to the marginal portion of either the leading or trailing edge of the mechanical protective film just prior to the overlapping step. Alternatively, the adhesive mass may be applied simultaneously to both marginal portions by introducing it at the nip between consecutive spiral convolutions of the film. In all cases, the mass is positioned to extend laterally to both sides of the leading edge of the film. The film is applied under tension and the film applies pressure to the hot melted adhesive which forces it to fill the space between and into intimate, bonding contact with the surface of the marginal portion of the trailing edge and the underlying surfaces of the corrosive protective tape and the leading edge of the film.

The thermoplastic adhesive is selected to be compatible with the corrosion protective tape and the mechanical protective film. The hot mass may be applied in the shape of a bead, ribbon or other continuous or discontinuous shapes.

The invention will be more clearly understood after reference to the following detailed specification read in conjunction with the drawings, wherein.

Figure 1:
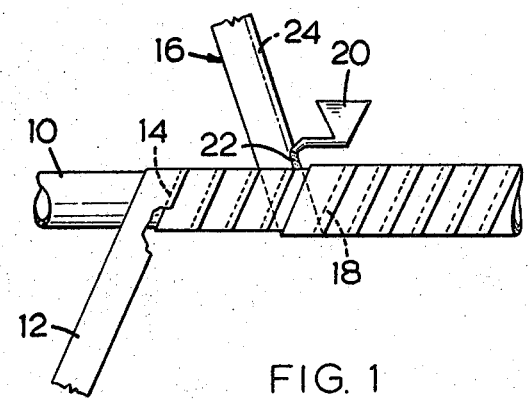
FIG. 1 is a diagrammatic side view of a pipe being coated according to the present invention.
Figure 2:
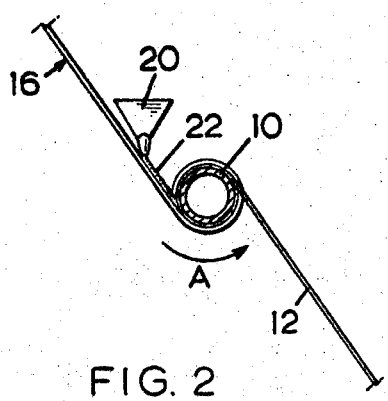
FIG. 2 is a cross sectional view of a portion of a pipe showing the manner in which the tapes are wound onto the pipe.

In the drawings, the reference numeral 10 refers generally to a metal pipe of the type which is commonly protected against corrosion and mechanical damage by a protective coating. The pipe is mounted for rotation in a conventional pipe coating machine, the direction of travel of the pipe during the wrapping operation being from left to right, as viewed in FIG. 1 of the drawings. A bottom layer of corrosion protective pressure sensitive adhesive tape 12 is spirally wound onto the pipe 10, with the adhesive layer in direct contact with the pipe. The pipe is rotated in the direction of the arrow A, as shown in FIG. 2, and tape 12 is spirally wound onto the pipe 10. The trailing edge of each convolution or wrap of the tape overlaps the leading edge of the previous convolution, as shown in broken lines at 14 in FIG. 1. The tape 12 preferably is one which will conform readily to the contour of the pipe to protect the pipe against corrosion. A satisfactory tape is one having polyethylene film backing measuring six mils in thickness and a pressure-sensitive adhesive layer one one side thereof measuring two mils in thickness.

The reference numeral 16 refers generally to a mechanical protective film which is spirally wound onto the pipe 10 over the tape wrapping 12. It is wound with a predetermined overlap, the trailing edge of each preceding convolution or wrap of the film overlapping the leading edge of the preceding convolution, with a predetermined overlap, as indicated in broken lines at 18 in FIG. 1. The overlap 18 formed by the outer wrap film 16 is preferably longitudinally spaced from the overlapped leading edge 14 formed by the inner tape 12, as shown in FIG. 3 of the drawings.

A hot melt extruder generally indicated by the reference numeral 20 is mounted in a position to discharge a bead or ribbon 22 of hot melted thermoplastic material onto a marginal edge portion 24 of the inner surface of the trailing edge of the film 16. The bead of hot melted thermoplastic material 22 is applied to the marginal edge portion 24 just prior to the nip where the film 16 forms the overlap 18. The discharging hot molten thermoplastic material is sufficiently hot to bond to the surface of the marginal edge portion 24 of the film 16 and the underlying portion of the leading edge of the film 16 and an underlying portion of the tape 12 adjacent thereto to structurally unite these portions. When the tape 12, film 16 and the bead 22 are made from polyethylene, the extruded bead 22 is preferably extruded at a temperature in the range 500° F. to 600° F. The extruder 20 may be a conventional thermoplastic extruder suitably adapted to discharge hot melted plastic adhesive onto the film 16, as described above.

Figure 3:
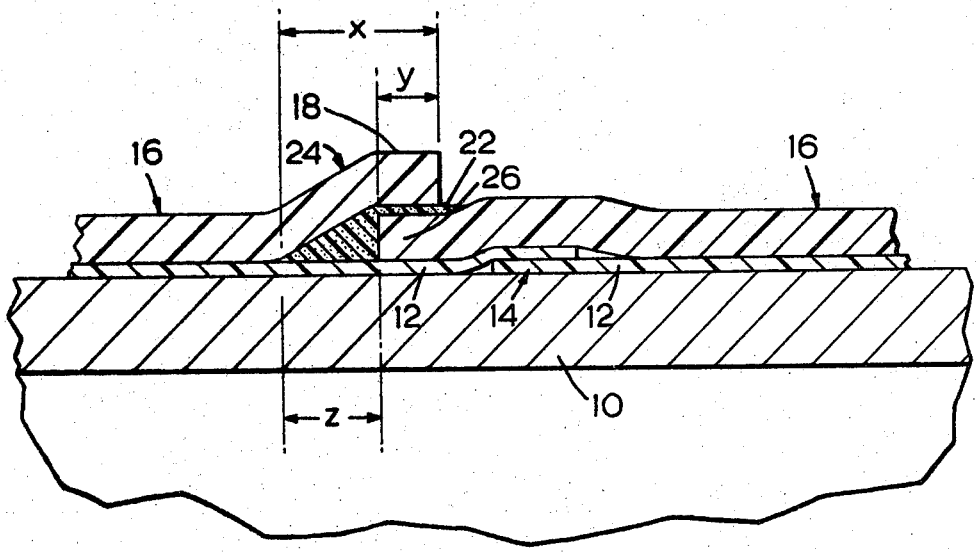
FIG. 3 is a partial longitudinal section view of a portion of a pipe showing the manner in which the overlap is formed.

The bond formed between the various covering members is more clearly shown in FIG. 3 of the drawings. The convolutions or wraps of the inner corrosion protection adhesive tape 12 on the pipe overlap one another, as shown at 14 in FIG. 3, to form a continuous inner protective coating. This coating is protected by a spirally overwrapped mechanically protective film 16, the trailing edge overlapping the leading edge of a preceding wrap, as shown at 18 and previously explained. The marginal edge portion 26 of the leading edge of the film 16 which is overlapped by the trailing edge is shown to have a width $y$. The trailing marginal edge portion 24 of the film 16 is shown to have a width $x$ which is greater in width than the portion $y$ by an amount $z$. The plastic adhesive material extends at least the full width $x$ of the marginal edge 24 and has a shape corresponding to the shape of the space between the inner surface of the marginal portion 24 and the surfaces which it overlies, namely the surface of the marginal portion 26 of the film 16 and the immediately adjacent surface of the tape 12. A shape of the thermoplastic adhesive material is illustrated in the cross-sectional view of FIG. 3. As shown there, the adhesive has a thickness in the region immediately adjacent the end surface of the leading edge of the film 16 thicker than any other portion thereof. The thickness of the adhesive in this region is equal to the thickness of the film 16 and the thickness of the adhesive layer sandwiched between the marginal portion 26 of the leading edge of the film and the overlapping portion in the width $y$ of the trailing edge of the film 16. The adhesive is of decreasing thickness in regions away from the end surface of the leading edge across the width $z$. The adhesive mass is forced into assuming this shape and into filling this space by the pressure applied to the bead 22 from the film 16 which is wrapped onto the pipe under a wrapping tension to give a snug and tight fit over the coated pipe. The bond formed by the thermoplastic material thus joins adjacent wraps of the film 16 and also joins the film 16 to the tape 12.

A saving in the cost of the adhesive is achieved by limiting the material to which the adhesive is applied to the marginal edge portion 24 which has a width $x$. The width of the film 16 may vary substantially and films measuring from two inches to eighteen inches in width are presently used. Where a two-inch wide film is used, the width $x$ may be in the range of one-quarter to one-half inch, or approximately 12.5 to 25% of the film width and, where an eighteen-inch wide film is in use, the width $x$ may be in the range of one-half inch to one and one-half inches, or approximately 2.78 to 8.33% of the film width. This would provide a saving in adhesive material of from approximately 75% to 97% over that previously used when pressure-sensitive adhesive tapes were used for coated pipe. When the tapes are made from a thermoplastic material such as polyethylene, the hot melt which forms the bead 22 may also be made from polyethylene, which is substantially less expensive than the conventional pressure-sensitive adhesives as presently in use.

It will be understood that the film 16 and backing for the tape 12 may be made from any of the well known plastic materials which are used in this industry such as polyethylene, polyvinyl chloride, acrylonitrile, butadiene styrene or polyproylene. A suitable film 16 which forms the outer mechanical protective coating may be made from high density polyethylene measuring from twenty to twenty-five mil in thickness.

I claim:

1. A method of coating a pipe comprising the steps of coating a pipe by progressively winding a corrosion protective adhesive coated plastic tape on the outer surface thereof with a marginal overlap, applying a mechanical protective film under a wrapping tension to the pipe by progressively winding a film of protective plastic material onto the pipe over said tape with an overlap, and applying a hot melted thermoplastic adhesive to the marginal portion of the trailing edge of said mechanical protective film as it is wound on said pipe, said thermoplastic adhesive being compatible with said corrosion protective tape and said mechanical protective film, said marginal portion having a greater width than the overlap of said mechanical protective film, said wrapping tension forcing the thermoplastic adhesive into intimate contact with the surface of the marginal edge portion of the trailing edge of said film and the underlying leading edge of said mechanical protective film and to the underlying portion of said corrosion protective tape to form a bond between said marginal edge portion, underlying leading edge, and underlying tape.

2. A method of coating a pipe as claimed in claim 1 wherein a gap is formed between the undersurface of said marginal edge portion of the trailing edge of the mechanical protective film and the underlying surfaces of the leading edge of the mechanical protective film and the corrosion resistant tape, said wrapping tension forcing said thermoplastic adhesive to fill said gap.

3. A method according to claim 2 including the step of forming an adhesive mass immediately adjacent the end surface of the leading edge of said film which is thicker than any other section of said adhesive.

4. A method of coating a pipe as claimed in claim 1, wherein the width of said marginal edge portion of said mechanical protective film is in the range of 2.78% to 25% of the width of said mechanical protective film.

5. A method according to claim 1, wherein the plastic material of said corrosion protective tape, said mechanical protective film and said thermoplastic adhesive are all made from the same thermoplastic material.

6. A method according to claim 5, wherein the plastic material of said tape and the mechanical protective film comprises polyethylene, and said thermoplastic adhesive comprises a polyethylene polymer.

References Cited

UNITED STATES PATENTS

| | | | |
|---|---|---|---|
| 3,400,029 | 9/1968 | Mesrobian et al. | 156—244 X |
| 3,525,656 | 8/1970 | Kennedy, Jr. | 156—392 X |
| 3,163,182 | 12/1964 | Sandow et al. | 156—188 X |
| 2,937,665 | 5/1960 | Kennedy | 156—187 X |
| 3,033,724 | 5/1962 | Stokes | 156—162 X |
| 2,550,520 | 4/1951 | Bennett | 161—145 X |

OTHER REFERENCES

Polyken Yard-Gard Precoating Specifications—Reference: yG–050963, published in 1963—4 pp.

Polyken Yard-Gard Precoating System Specifications, published in 1966—4 pp.

PHILIP DIER, Primary Examiner

U.S. Cl. X.R.

138—144; 156—188, 195, 244; 161—145